(No Model.)

C. E. SHELDON.
PADDED HORSESHOE.

No. 585,290. Patented June 29, 1897.

Witnesses
Albert H. Bates.
Robert K. S. Catherwood.

Inventor
Charles E. Sheldon
by Robt. H. Parkinson Atty.

United States Patent Office.

CHARLES E. SHELDON, OF AKRON, OHIO, ASSIGNOR TO THE WHITMAN & BARNES MANUFACTURING COMPANY, OF SAME PLACE.

PADDED HORSESHOE.

SPECIFICATION forming part of Letters Patent No. 585,290, dated June 29, 1897.

Application filed December 21, 1896. Serial No. 616,538. (No model.)

*To all whom it may concern:*

Be it known that I, CHARLES E. SHELDON, a citizen of the United States, residing in the city of Akron, county of Summit, and State of Ohio, have invented a certain new and useful Improvement in Padded Horseshoes, of which the following is a full, clear, and exact description, reference being had to the accompanying drawings.

My invention relates to elastic-tread or cushioned horseshoes; and its object is to form a shoe with pads adapted to prevent slipping and to allow the horse to stand upon so much of his frog as he would stand upon in a natural unshod state, while allowing perfect ventilation for the sole and keeping it accessible. The frog of the hoof is a natural elastic pad tending to prevent slipping, but the ordinary method of shoeing raises the frog from the ground and thus tends to nullify its action. My invention restores this action, giving the horse a more natural tread, with more security against slipping or straining, and by preserving the normal function of the frog and giving it proper exercise obviates evils which frequently cause lameness.

My invention consists of a shoe having at the heel thereof elastic pads extending under the frog of the hoof and affording an elastic support thereto.

Heretofore elastic-tread horseshoes have been made; but they have not, so far as I am aware, had pads adapted either to effectually prevent slipping or to allow the horse to stand upon a portion of his frog. I am also aware that pads covering the under surface of the hoof and having elastic material on their under side extending across the frog have been applied independently of the shoe. These pads are objectionable in various ways. Among the disadvantages it may be mentioned that they are inaccessible for purposes of cleaning, liable to accumulate gravel and filth within the sole and cause irritation, or to prevent free circulation of the air and induce thrush. They also have the disadvantage that a different-sized pad is required for each different size of hoof.

The drawings show my invention having my improved manner of constructing and applying the pads.

Figure 1:
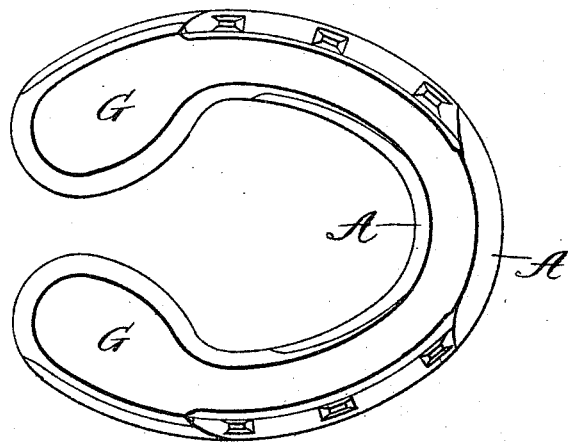
Figure 2:
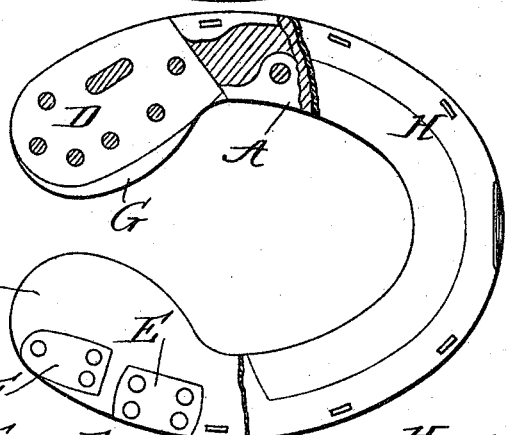
Figure 3:
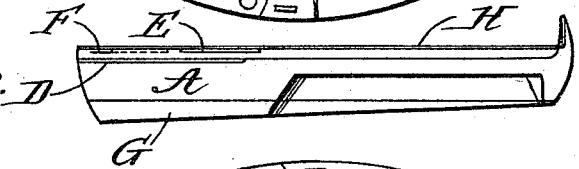
Figure 4:
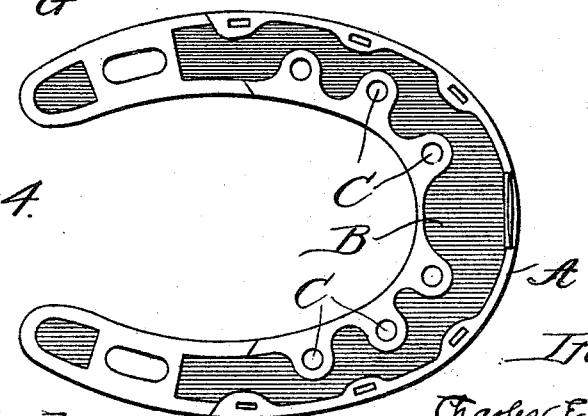

Figure 1 is a bottom view of my improved horseshoe complete. Fig. 2 is a top view of the same, partially in section. Fig. 3 is an elevation of the same, and Fig. 4 is a top view of the metallic frame on which the shoe is formed.

Similar letters of reference designate similar parts in each figure.

To the upper and lower surfaces of a metallic frame A, preferably of steel, are secured by vulcanizing or in other proper manner cushions of caoutchouc or other elastic material. The frame is provided with recesses B on its top and bottom, which aid in retaining the elastic material in place. Holes C may be made in the frame to allow the upper and lower cushions to be bound together by their material passing through the holes. These holes may be omitted, if preferred, and while I prefer to have both the upper and lower surfaces of the frame substantially covered by the elastic cushions some portions of these cushions may be omitted, while retaining material parts of my invention.

At the heel of the frame, on the upper side, are preferably placed thin plates D of steel or other suitable material. These plates have holes through them, as shown, and are firmly held in place by the elastic material which is forced through those holes in the process of manufacture.

At the heel of the shoe I extend the cushion inward to form the pads G. These pads are preferably made integral with the rest of the cushions, being of caoutchouc or other suitable material, and are reinforced by these plates D. The pads extend inward sufficiently to cover and support the bulb of the heel—that is, the portion of the bar and frog upon which the horse would naturally stand—but do not extend inward far enough to close the middle crevice or *media lacuna* of the frog. They extend vertically somewhat more than the thickness of the frame, so as to afford an elastic tread. The shoe may be shaped cold to fit hoofs of different contour, and is nailed to the wall of the hoof in the usual manner.

To prevent the hoof from cutting the elastic material which is applied on the upper portion of the frame to cushion the shoe, I provide thin metallic plates E and F at the outer edge of the heel, where the hoof has the greatest tendency to cut. These plates are embedded into the elastic covering sufficiently to have their top surfaces flush with the covering. The plates D, E, and F, or some of them, might be omitted and the shoe retain many of the advantages of my invention. I regard it desirable, however, to retain them, as they have material advantages. In case, however, where the quarter of the hoof is particularly sensitive, it may be preferable to omit them or to cut away the frame somewhat, so as to increase the thickness of the cushion at that point. Over the top of the shoe I prefer to attach a piece of canvas H; but this may also be omitted, if desired. As the horse strikes his toe first and then brings down the rest of the hoof, it is evident that there will be much wear upon the toe of the shoe. I therefore cause the frame to form a steel toe, as shown, and make the amount of extension of the elastic cushion below the frame of the shoe increase gradually from the steel toe to the pads. The elastic material is thus distributed according to the wear and is greatest at that part of the shoe where the wear is least. The durability of the shoe is thus very materially increased, the steel in the front part of the shoe reducing the wear to the lowest limit, while the pads at the rear continue to serve until the frame is substantially worn out. This construction also elevates the heel of the shoe somewhat, which is desirable.

My invention having the pads secured to the heel of the shoe and not extending continuously from one side to the other allows the change of shape of the shoe to fit different-sized hoofs, allows the free circulation of the air at all times, and provides for the horse using his foot in the normal way. An unyielding support to the frog of the hoof is disadvantageous; but the elastic support which my improved shoe gives restores the natural manner of tread of the foot, strengthens the muscles of the frog which are apt otherwise to atrophy, and prevents lameness of the horse resulting from carrying his weight on an unnatural area of the hoof.

My invention is capable of modification from the form shown in the drawings and hereinbefore specifically described, and I do not wish to be understood as limiting myself to the specific features of construction shown, except in those claims where these features are specified.

Having thus described my invention, what I claim is—

1. A horseshoe having near the heel thereof elastic pads projecting inward and adapted to bear upon the frogs of the foot, and to extend vertically from said frogs to approximately the plane of the tread of the shoe and afford a direct elastic support between said frogs and the ground or floor, for the purposes described.

2. An open horseshoe composed of a cushioned metallic frame adapted to support the walls of the hoof and having elastic heel-pads projecting inward sufficiently to engage the frogs of the foot, said pads extending vertically beneath said frogs from approximately the plane of the upper surface of the shoe to approximately the plane of the tread of the shoe, whereby the frogs of the foot are afforded elastic vertical support upon the ground through the medium of said pads, for the purposes described.

3. A horseshoe composed of a metallic frame, thin reinforcing-plates extending inward from the heel thereof, and an elastic pad also extending inward from the heel enveloping said plates and supporting the frog, for the purpose set forth.

4. An open horseshoe having a metallic frame adapted to be nailed to the hoof, and having embedded in said frame, so as to form the tread thereof a body of elastic material increasing in thickness toward the heel and flaring inward at the heel sufficiently to project under the frogs of the foot and afford them elastic vertical support, for the purposes set forth.

5. A horseshoe composed of a metallic frame and an elastic cushion upon the upper surface thereof, and one or more plates secured to the upper surface of the cushion and adapted to prevent the hoof from cutting the same, for the purpose specified.

6. A horseshoe having in combination the frame A, the elastic cushion above and below said frame, and the plates D and E embedded in said cushions, the said plate D operating to reinforce an extension of said cushions forming an elastic pad, substantilly as described.

CHARLES E. SHELDON.

Witnesses:
A. D. ARMITAGE,
C. E. CASKEY.